United States Patent
Xu et al.

(10) Patent No.: US 9,285,945 B2
(45) Date of Patent: Mar. 15, 2016

(54) METHOD AND APPARATUS FOR DISPLAYING MULTI-TASK INTERFACE

(71) Applicant: Huawei Technologies Co., Ltd., Shenzhen, Guangdong (CN)

(72) Inventors: Jin Xu, Shenzhen (CN); Xuesong Xu, Shenzhen (CN); Jun Yuan, Shenzhen (CN); Yi Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 13/947,704

(22) Filed: Jul. 22, 2013

(65) Prior Publication Data
US 2014/0033037 A1    Jan. 30, 2014

(30) Foreign Application Priority Data
Jul. 24, 2012    (CN) .......................... 2012 1 0257559

(51) Int. Cl.
| | |
|---|---|
| *G06F 3/048* | (2013.01) |
| *G06F 9/44* | (2006.01) |
| *H04N 5/44* | (2011.01) |
| *H04N 21/422* | (2011.01) |
| *H04N 21/431* | (2011.01) |
| *H04N 21/482* | (2011.01) |

(52) U.S. Cl.
CPC .............. *G06F 3/048* (2013.01); *G06F 9/4443* (2013.01); *H04N 5/4403* (2013.01); *H04N 21/4221* (2013.01); *H04N 21/4312* (2013.01); *H04N 21/482* (2013.01); *H04N 2005/4412* (2013.01)

(58) Field of Classification Search
None
See application file for complete search history.

(56) References Cited

U.S. PATENT DOCUMENTS

| | | | |
|---|---|---|---|
| 5,673,401 A * | 9/1997 | Volk | G06F 3/04847 348/E5.103 |
| 6,118,428 A | 9/2000 | Blackmon et al. | |
| 7,068,291 B1 | 6/2006 | Roberts et al. | |
| 2002/0066101 A1 | 5/2002 | Gordon et al. | |
| 2006/0242592 A1* | 10/2006 | Edwards | G09B 5/00 715/764 |
| 2007/0050724 A1 | 3/2007 | Lee et al. | |
| 2008/0034325 A1* | 2/2008 | Ording | G06F 3/04817 715/838 |
| 2009/0013048 A1* | 1/2009 | Partaker | G06Q 10/107 709/206 |

(Continued)

FOREIGN PATENT DOCUMENTS

| | | |
|---|---|---|
| EP | 1835384 A2 | 9/2007 |
| GB | 2411559 A | 8/2005 |

OTHER PUBLICATIONS

"PyS60 Library Reference," Release 1.3.1 final, Nokia Corporation, Espoo, Finland (Jan. 27, 2006).

*Primary Examiner* — Tadeese Hailu
(74) *Attorney, Agent, or Firm* — Leydig, Voit & Mayer, Ltd.

(57) ABSTRACT

An embodiment of the present invention provides a method for displaying a multi-task interface. The method includes: receiving, by a terminal, a request submitted by a user for displaying a multi-task interface; acquiring tasks started by the user and setting, according to the number of tasks started by the user and a start sequence, an arrangement manner of the multi-task interface; classifying the tasks started by the user into a video playing task and a non-video playing task; and separately drawing the video playing task and the non-video playing task according to the arrangement manner of the multi-task interface to obtain the multi-task interface, and displaying the multi-task interface to the user. In addition, embodiments of the present invention provide a corresponding terminal and a remote control.

8 Claims, 6 Drawing Sheets

(56) References Cited

U.S. PATENT DOCUMENTS

2009/0300629 A1* 12/2009 Navon .................. G06F 9/4881
                                                    718/102
2011/0283296 A1* 11/2011 Chun ................ H04M 1/72522
                                                    719/318
2012/0076197 A1* 3/2012 Byford ................... H04N 19/00
                                                    375/240.01

* cited by examiner

Graphic layer in front    Video layer in front

METHOD AND APPARATUS FOR DISPLAYING MULTI-TASK INTERFACE

CROSS-REFERENCE TO RELATED APPLICATION

This application claims priority to Chinese Patent Application No. 201210257559.3, filed on Jul. 24, 2012, which is hereby incorporated by reference in its entirety.

TECHNICAL FIELD

The present invention relates to the field of communications technologies, and in particular, to a method and an apparatus for displaying a multi-task interface.

BACKGROUND

As people raises increasingly-higher requirements for a terminal device such as a mobile phone or a set-top box, a manner in which a terminal device manages a task has gradually changed from single-task running to a multi-task manner, and a system allows multiple tasks to simultaneously work, so that a user's requirements such as surfing the Internet, listening to music, and chatting may be simultaneously met. When the user switches between multiple tasks, icons of tasks used recently may be displayed through a certain operation. Then an icon of a task to which the user wants to switch is selected to switch to the new task.

In the prior art, a conventional multi-task interface of a mobile phone, a set-top box, or the like, presents icons of tasks that a user has run in a latest period of time or an icon of a currently running task. Information that may be conveyed to the user by using this manner is relatively little, because an icon is only a representation of a task and an interface when a task is running cannot be seen when only the icon of the task is displayed. Particularly, as nowadays various types of terminal applications are increasingly abundant, a user installs or uninstalls a new application at an increasingly-higher frequency. For some newly installed applications, more often a user is not familiar with an icon, feels very strange when seeing the icon, and does not understand which task the icon represents.

In addition, an icon on a multi-task interface of a terminal such as an existing mobile phone or a set-top box is often static and an interface when a task is running cannot be displayed. Taking a video playing task as an example, on a conventional multi-task interface, a user can see only an icon of a task instead of abbreviated information about content currently being played. In addition, the size of an icon on a multi-task interface is fixed and cannot be changed to a different size along with a change in the number of tasks, and therefore cannot either express some different information as the type of the task changes.

SUMMARY

To solve a technical issue that an existing multi-task interface can only display a fixed task icon to convey limited information to a user, an embodiment of the present invention provides a method for displaying a multi-task interface. The method includes: receiving, by a terminal, a request submitted by a user for displaying a multi-task interface; acquiring tasks started by the user and setting, according to the number of tasks started by the user and a start sequence, an arrangement manner of the multi-task interface; classifying the tasks started by the user into a video playing task and a non-video playing task; and separately drawing the video playing task and the non-video playing task according to the arrangement manner of the multi-task interface to obtain the multi-task interface, and displaying the multi-task interface to the user.

An embodiment of the present invention provides a terminal. The terminal includes: a receiving module, configured to receive a request submitted by a user for displaying a multi-task interface; a setting module, configured to acquire tasks started by the user and set, according to the number of tasks started by the user and a start sequence, an arrangement manner of the multi-task interface; a drawing module, configured to classify the tasks started by the user into a video playing task and a non-video playing task and separately draw, according to the arrangement manner of the multi-task interface that is set by the setting module, the video playing task and the non-video playing task to obtain the multi-task interface; and a displaying module, configured to display the multi-task interface drawn by the drawing module to the user.

Another embodiment of the present invention further provides a remote control, configured to operate a set-top box, including the following: The remote control includes a multi-task interface function key; and after receiving a key-pressing operation performed by a user on the multi-task interface function key, the remote control identifies the key-pressing operation as a command for displaying a multi-task interface and sends a request for displaying the multi-task interface to the set-top box.

By using the solutions for displaying a multi-task interface that are disclosed in the embodiments, a multi-task interface displays no longer simple task icons. Instead, display interfaces, which are obtained after a terminal separately draws a video playing task and a non-video playing task according to an arrangement manner of the multi-task interface, are capable of providing a user with more information to better distinguish various tasks from one another.

DESCRIPTION OF EMBODIMENTS

To facilitate persons of ordinary skill in the art to understand and implement the present invention, the following describes embodiments of the present invention with reference to the accompanying drawings.

To solve the foregoing technical issue, an embodiment of the present invention provides a method for displaying a multi-task interface. A terminal to which the method may be applied includes but is not limited to a set-top box, a smart mobile phone, a tablet computer, and the like.

Figure 1:
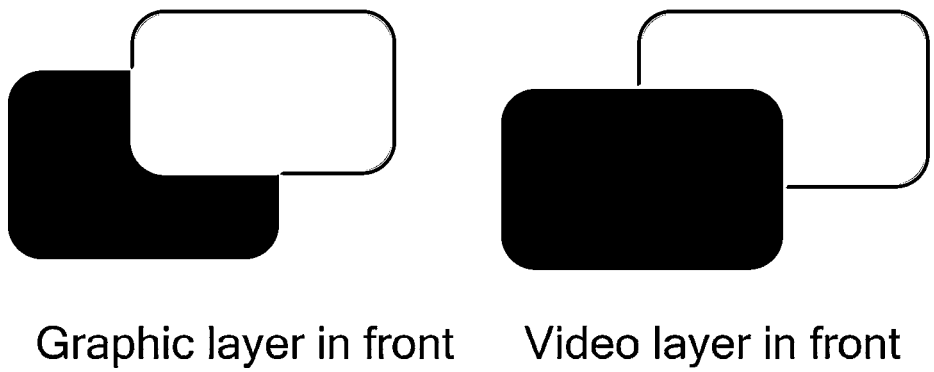
FIG. 1 is a schematic diagram of a sequential relationship between a graphic layer and a video layer according to an embodiment of the present invention.

Generally, content displayed on the terminal may be classified into two types: graphic layer and video layer. For presented content of the graphic layer, generally an SDK (Software Development Kit, software development kit) provides an API (Application Programming Interface, application programming interface) for a developer to perform control. Generally, presented content of the video layer is automatically completed by a bottom layer of a decoding and presentation chip of the terminal. The developer cannot participate and perform control. The SDK provides an API for the developer to set a sequential relationship (a Z sequence) between the graphic layer and the video layer. The sequential relationship between the graphic layer and the video layer is shown in FIG. 1, which indicates two cases: the graphic layer is in front or the video layer is in front.

The graphic layer may be composed of multiple sublayers. Taking a set-top box as an example, generally the graphic layer may include a browser layer, a caption layer, a teletext (teletext) layer, and the like. A relationship between various sublayers includes a Z sequence and transparency. A Z sequence relationship between sublayers is the same as the Z sequence relationship between the graphic layer and the video layer as described previously as shown in FIG. 1; and the transparency indicates whether a preceding sublayer completely shades content of a succeeding sublayer. For ease of description, a combined operation of setting the Z sequence and the transparency is subsequently called a blit operation. The graphic layer comes into being after a blit operation is performed on the multiple graphic sublayers.

In the embodiment of the present invention, display of a multi-task interface is implemented by adding a multi-task interface layer to the graphic layer. Certainly, this may also be implemented by reusing an existing browser layer or caption layer.

Figure 2:
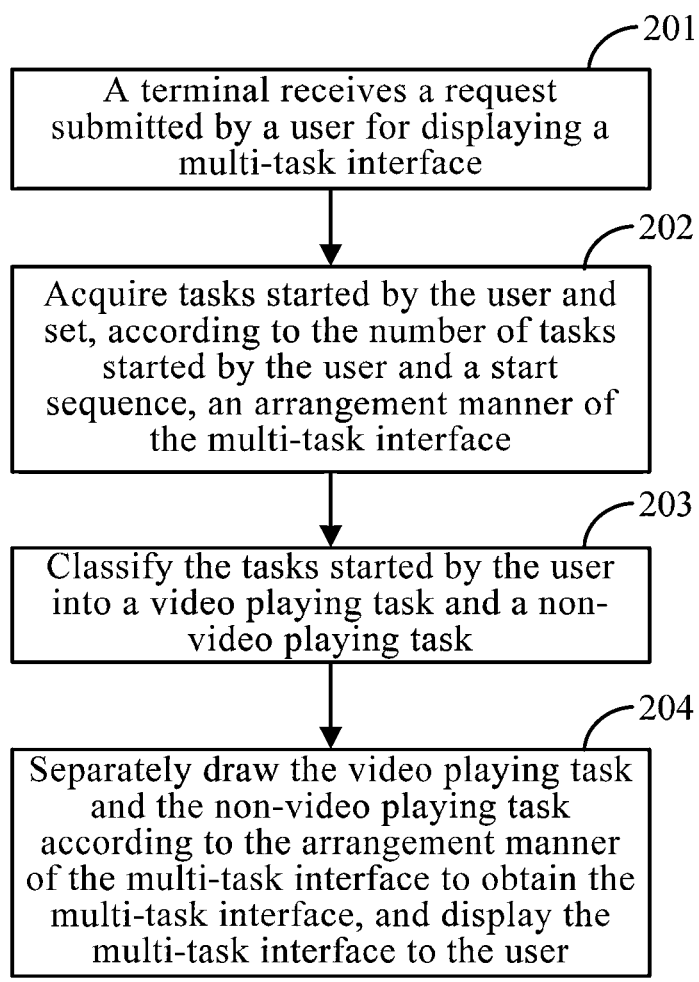
FIG. 2 is a schematic diagram of a method for displaying a multi-task interface according to an embodiment of the present invention.

FIG. 2 is a schematic diagram of a method for displaying a multi-task interface according to an embodiment of the present invention. Steps in the method are described in detail as follows:

Step 201: A terminal receives a request submitted by a user for displaying a multi-task interface.

The terminal includes but is not limited to a mobile phone, a tablet computer, a set-top box, and the like.

Step 202: The terminal acquires tasks started by the user and sets, according to the number of tasks started by the user and a start sequence, an arrangement manner of the multi-task interface.

A task to be presented on the multi-task interface is a task that the user has started and has not yet exited. The terminal sets an arrangement manner of various tasks on the multi-task interface according to the number of tasks started by the user and a sequence of start time.

Specific content about setting the arrangement manner of the multi-task interface is described in an embodiment to follow later.

Step 203: The terminal classifies the tasks started by the user into a video playing task and a non-video playing task.

According to the content described previously, means by which the terminal processes a graphic layer and a video layer are different. Therefore, the tasks started by the user need to be classified into the video playing task and the non-video playing task for separate processing.

Step 204: Separately draw the video playing task and the non-video playing task according to the foregoing arrangement manner of the multi-task interface to obtain the multi-task interface, and display the multi-task interface to the user.

By using the solution for displaying a multi-task interface that is disclosed in this embodiment, a multi-task interface displays no longer simple task icons. Instead, display interfaces, which are obtained after a terminal separately draws a video playing task and a non-video playing task according to an arrangement manner of the multi-task interface, are capable of providing a user with more information to better distinguish various tasks from one another.

Figure 3:
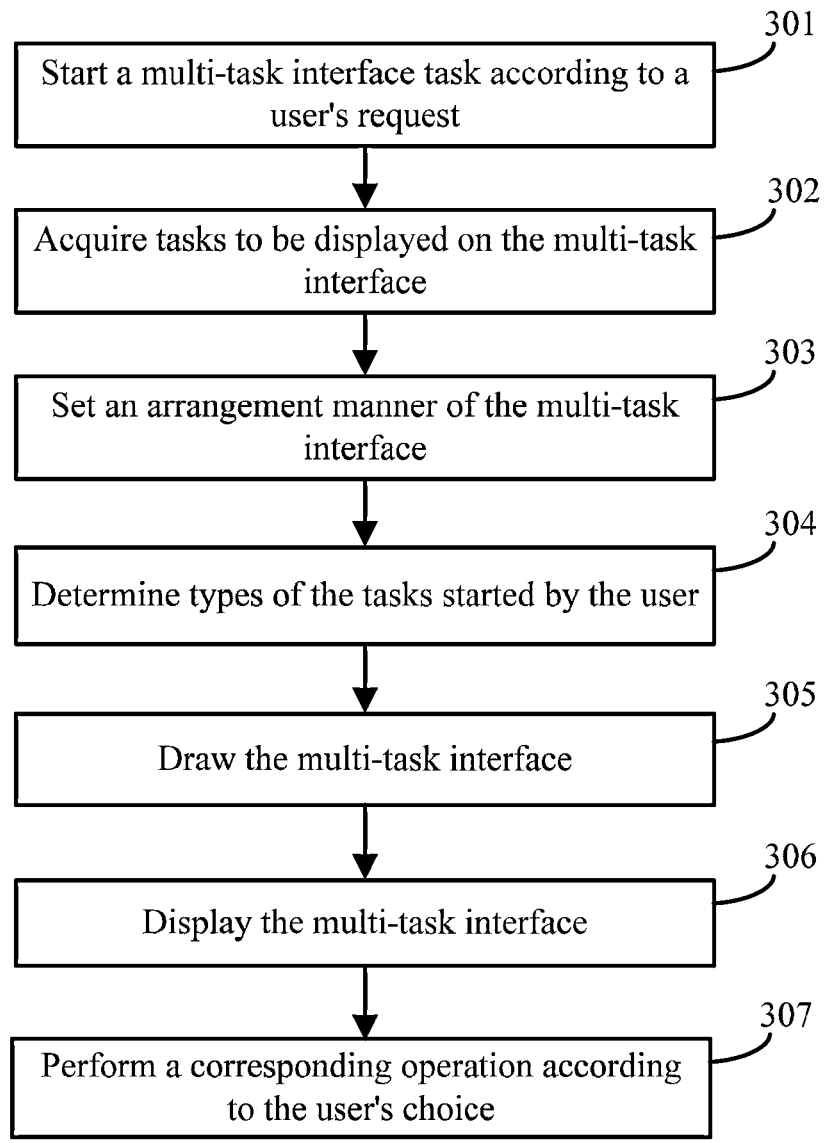
FIG. 3 is a flowchart of steps for displaying a multi-task interface according to an embodiment of the present invention.

FIG. 3 is a flowchart of steps for displaying a multi-task interface according to an embodiment of the present invention. The following describes in detail the steps for displaying a multi-task interface with reference to this diagram.

Step 301: A terminal starts a multi-task interface task according to a user's request.

In response to the user's request, the terminal starts a specific task to process the user's request for displaying a multi-task interface. For ease of description, in the following, this task is called a "multi-task interface task". The name should not be construed as a limitation to embodiments of the present invention.

Figure 4:
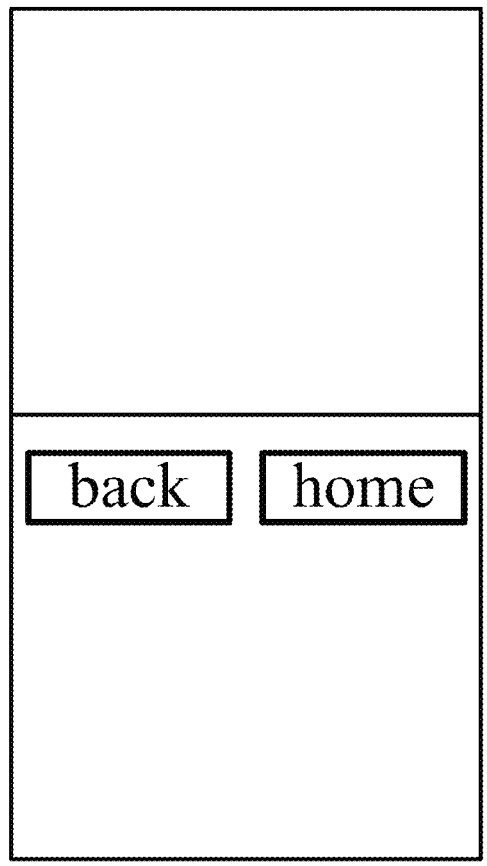
FIG. 4 is a schematic diagram of a remote control that has a "multi-task interface" function key according to an embodiment of the present invention.

Particularly, for a set-top box, the embodiment of the present invention provides a remote control that has a "multi-task interface" function key as shown in FIG. 4. When a user presses a Home key shown in FIG. 4, it indicates requesting the set-top box to display a multi-task interface. The remote control mentioned in this embodiment includes but is not limited to a conventional remote control, a soft remote control (auxiliary control software developed on Android or iOS), an air mouse, and the like.

While the terminal is starting the multi-task interface task, a currently running task switches to a back end and a corresponding operation is performed depending on whether the currently running task is a music playing task: When the multi-task interface is entered from a music playing task, the music playing task continues to run at the back end and music continues to be played; or when the user enters the multi-task interface from another task, the original running task pauses.

After the multi-task interface task is started, execution subjects of all the following steps are the multi-task interface task.

Step 302: Acquire tasks to be displayed on the multi-task interface.

Here, the acquired task to be displayed on the multi-task interface is a task that the user has started and has not yet exited and generally includes a corresponding task interface but excludes a back-end service automatically started by a system, for example, an NTP (Network Time Protocol, Network Time Protocol) time service will not be displayed on the multi-task interface.

Step 303: Set an arrangement manner of the multi-task interface.

The multi-task interface task may set the arrangement manner of the multi-task interface according to the number of tasks currently running and a sequence of task start time. The arrangement manner of the multi-task interface includes arranged positions and display sizes of various tasks started by the user on the multi-task interface.

Particularly, in the embodiment of the present invention, the multi-task interface task may dynamically adjust the arrangement manner of the multi-task interface according to the number of tasks started by the user.

Figure 5:
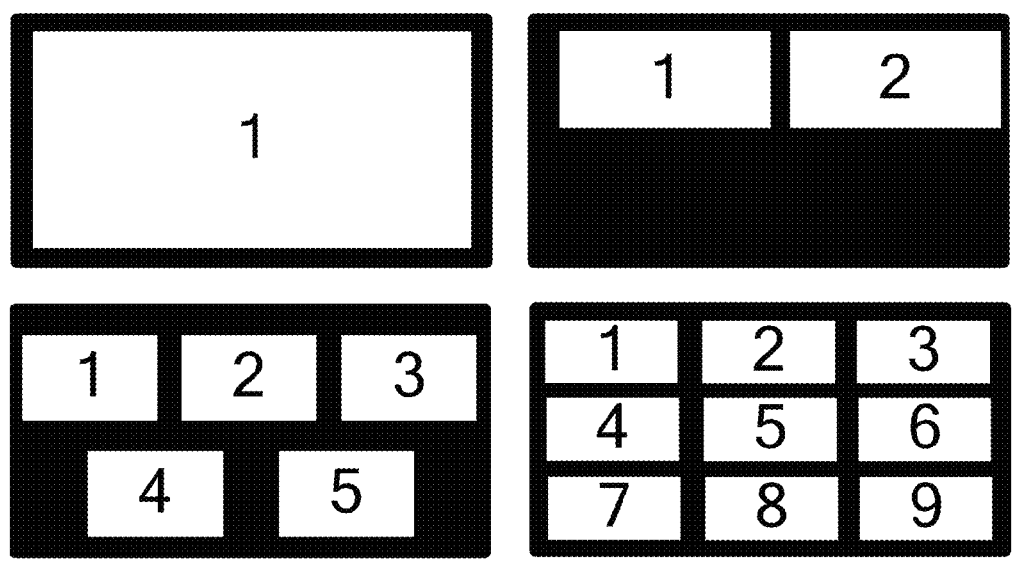
FIG. 5 is an exemplary diagram of displaying a multi-task interface according to an embodiment of the present invention.

FIG. 5 is an exemplary diagram of displaying a multi-task interface according to an embodiment of the present invention. Each digit represents a different task displayed on the multi-task interface. This diagram shows that the multi-task interface takes on different arrangement manners as the number of tasks is different. When the number of tasks started by the user is large and all of them cannot be displayed on one page, the tasks may be displayed on multiple pages.

The above arrangement manners of the multi-task interface are examples only. For multi-task interfaces with different resolution and length-to-width ratios, the number of displayable tasks in each row is also different. This is still within the protection scope of the embodiment of the present invention.

Step 304: Determine types of the tasks started by the user.

The multi-task interface task acquires, by using an inter-process communication mechanism, the types of these tasks, which include but are not limited to the following types: a video playing task, a music task, an image task, a browser task, and the like. A task type reflects a task for which an additional element needs to be displayed or a non-video playing task for which a task interface needs to be constantly updated on the multi-task interface.

The foregoing task types may be summarized as two types: a video playing task and a non-video playing task. A reason why to distinguish the two types of tasks is that different drawing methods need to be used for different types of tasks in steps to follow later.

Step 305: Draw the multi-task interface.

The video playing task and the non-video playing task are separately drawn according to the foregoing arrangement manner of the multi-task interface to obtain the multi-task interface.

For a video playing task, its display interface is obtained by setting display attributes of a decoder; and for a non-video playing task, its drawing includes drawing of a running interface of the task and its additional display element (in a case that the task has any additional display element). A detailed drawing process is described in an embodiment to follow later.

Step 306: Display the multi-task interface.

The multi-task interface may be displayed to the user after the drawing is completed.

Step 307: Perform a corresponding operation according to the user's choice.

After the terminal displays the multi-task interface to the user, the user may request, through the interface, the terminal to perform various operations. For example, on the interface, the user may select to switch to a certain task and may also select to exit a certain task.

Particularly, an embodiment of the present invention provides a method for switching a task, where the method is applied to a remote control. The method may be also applied to the remote control that has a "multi-task interface" function key provided in the foregoing embodiment. After the set-top box displays the multi-task interface to the user through a television set, if a focal point of the remote control stays on a certain task for a period of time (such as one second), the multi-task interface task will switch a currently running task to this certain task whereas the currently running task will switch to a status of running at the back end.

An example is given to describe a change in the running status of a task when the focal point of the remote control moves: When the user selects to enter the multi-task interface from a music playing task (a music player A), the music player A may continue with playing and at this time, no focal point is set on the multi-task interface. The user may operate the remote control to move the focal point. When the focal point moves to a video playing task and stays for a preset period of time (such as one second), the original music playing task (the music player A) pauses, the video playing task starts to run on the multi-task interface, and a small window is used for video playing. Then the user operates the remote control again to move the focal point from the video playing task to another browser task and stays for a preset period of time (such as one second), the video playing task pauses and the original music playing task (the music player A) resumes its running. When the focal point moves once again from the browser task to another music playing task (a music player B) and stays for a preset period of time (such as one second), the original music playing task (the music player A) pauses and the new music playing task (the music player B) starts running Hoping that the music player B stops playing, the user may move the focal point to an abbreviated interface of another task and let the focal point stay for a certain time, so that the music player A performs playing. The rest may be deduced by analogy, making it possible to smoothly switch between multiple tasks.

By using the solutions for displaying a multi-task interface that are disclosed in the embodiment of the present invention, a dynamic interface when a task runs may be displayed on a multi-task interface of a terminal such as a smart mobile phone, a tablet computer, or a set-top box, instead of simply displaying a task icon. In addition, more information may be presented to a user by combining display of an additional element. Furthermore, it is made possible that experience with music playing or another real-time service is not affected during multi-task interface browsing, and quick switching of played content may be further made possible during switching between multiple music playing tasks.

After the multi-task interface drawing is completed, some non-video playing tasks may still be constantly updated when they are on the multi-task interface. For example, for a Video-Phone (video phone) task or an album task that automatically plays, its picture may still be periodically updated when the task is on the multi-task interface.

An embodiment of the present invention provides a method for updating a multi-task interface. Updating of a multi-task interface first needs to rely on the types of the tasks that are acquired in the preceding step 304. For a task that needs to be constantly updated, an updating period of the task is acquired. Then a multi-task interface task periodically draws a new display interface according to the task updating period and keeps updating the display interface of the task, so that presentation of a real-time service is not affected when the task is on the multi-task interface. For example, a video phone task displayed on the multi-task interface may still keep being updated.

Figure 6:
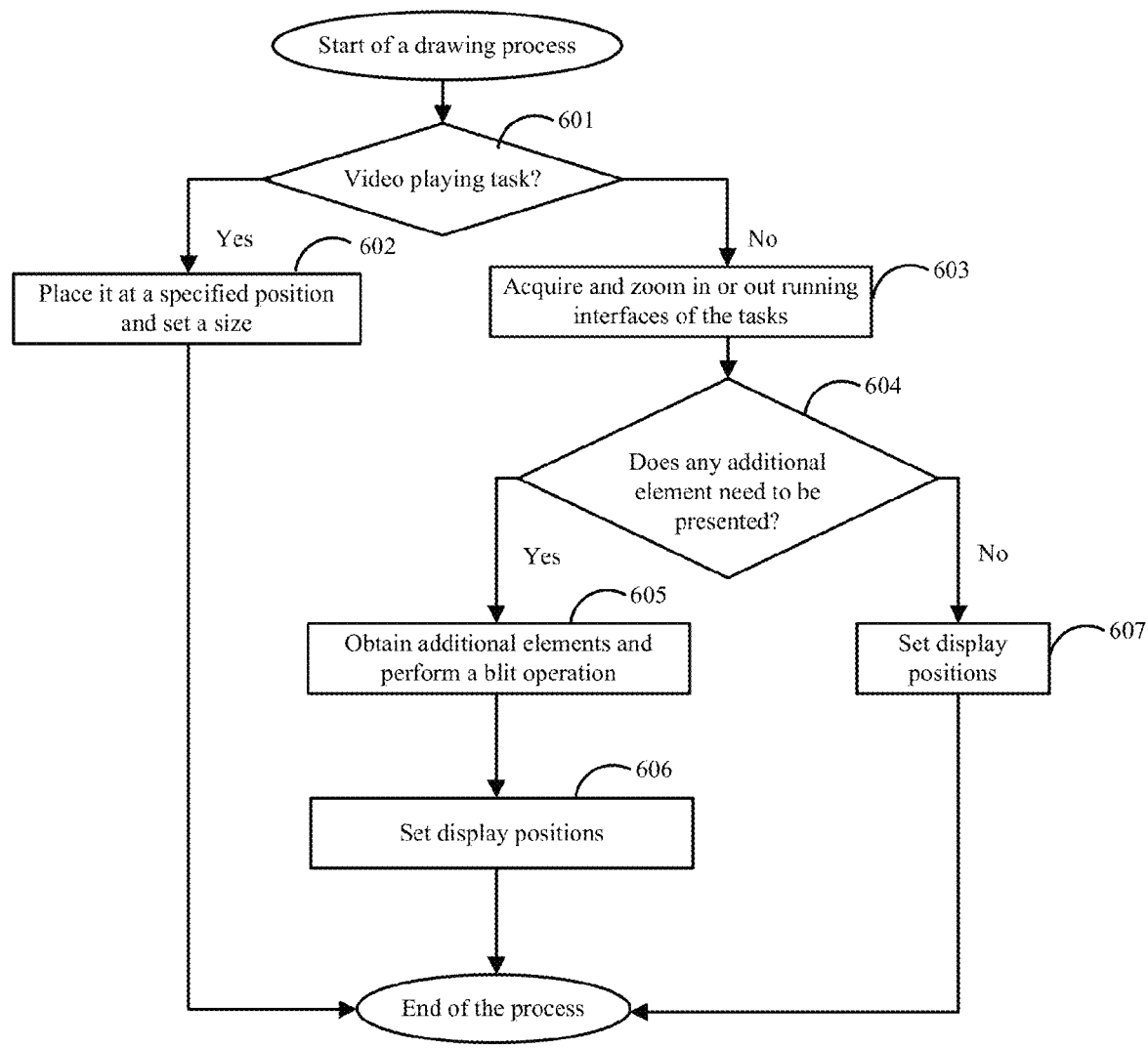
FIG. 6 is a flowchart of drawing a multi-task interface according to an embodiment of the present invention.

FIG. 6 is a flowchart of drawing a multi-task interface according to an embodiment of the present invention. The following describes in detail a process of drawing a multi-task interface with reference to this diagram.

Step 601: A multi-task interface task first classifies, according to types of tasks, tasks started by a user into two types: a video playing task and non-video playing task.

As mentioned in the preceding embodiment, because for a task of a video type, a running interface thereof cannot be acquired by using by using an inter-process communication mechanism and a running interface of a video playing task is updated very quickly, a video playing task needs to be separately processed.

Step 602: Place the video playing task at a specified position of a multi-task interface by directly invoking an API and set its display size.

For a video playing task, a decoder directly performs drawing. The multi-task interface task sets, according to a position and a size of the video playing task that are determined in the step 305, a display attribute of the decoder by invoking the API, so that the video playing task can perform playing at the corresponding position on the multi-task interface according to the set size. In addition, pause and resumption of the video playing task may be controlled according to an operation of the user.

Step 603: For the non-video playing task, the multi-task interface task acquires running interfaces of the tasks in turn and zooms in or out the running interface according to the size set in the preceding step 303.

For non-video playing tasks started by the user, respective running interfaces are provided according to invoking commands from the multi-task interface task.

The running interfaces provided by various tasks may be current running interfaces or may also be running interfaces with customized settings, so that these tasks have an individualized and nice-looking effect of display on the multi-task interface. The running interfaces with customized settings may be stored in the tasks in advance. After the commands for invoking the running interfaces are received, the customized running interfaces are sent to the multi-task interface task.

After the running interfaces of the tasks are acquired, the running interfaces are zoomed in or out according to the size set in the step 303 to obtain zoomed running interfaces of the tasks.

Step 604: Determine whether any additional element needs to be presented for the non-video playing task.

In the preceding step 304, the multi-task interface task has acquired the types of the tasks by using the inter-process communication mechanism, including tasks for which additional elements need to be presented. In this step, the multi-task interface task determines, according to such information, a non-video playing task for which additional elements need to be presented.

Step 605: For the non-video playing task for which additional elements need to be presented, acquire additional display elements of the tasks and perform a blit operation on these additional display elements and the running interfaces of the tasks that are acquired in the step 603 to obtain display interfaces of the tasks.

Figure 7:
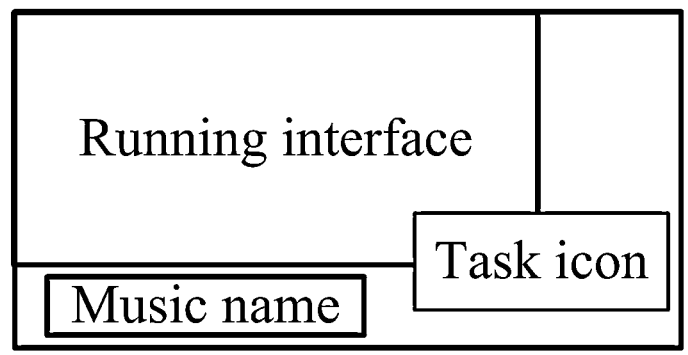
FIG. 7 is an exemplary diagram of a display interface of a music playing task including an additional element according to an embodiment of the present invention.

For example, FIG. 7 shows a display interface of a music playing task including an additional element. In addition to a running interface that includes the task itself, a task icon is combined at the lower right corner of the running interface to avoid the following issue: When multiple players are playing same music, their running interfaces are consistent and can hardly be distinguished. In addition, the name of music currently being played is further presented as an additional element at the bottom of the running interface of the task.

With reference to the display interface of the music playing task including the additional element as shown in FIG. 7, an embodiment of the present invention discloses a method for drawing irregular boundaries of a multi-task interface.

Figure 8:
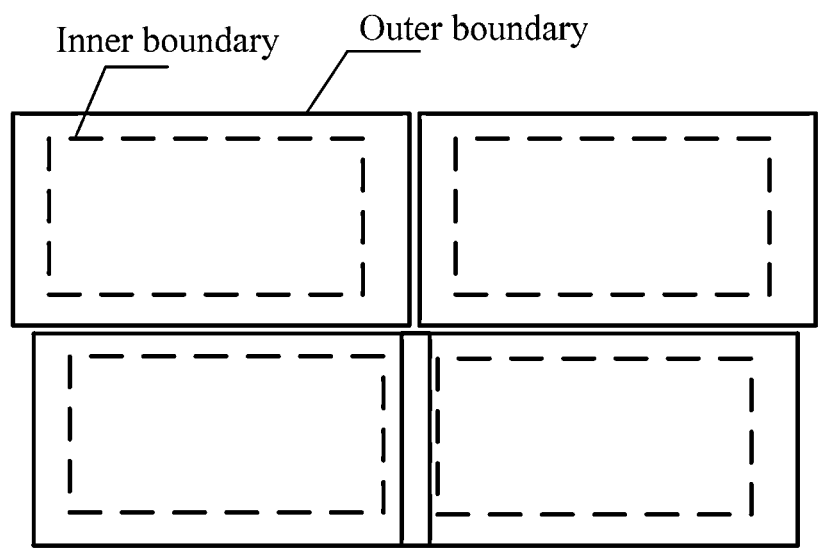
FIG. 8 is an exemplary diagram of drawing irregular boundaries of a multi-task interface according to an embodiment of the present invention.

By using this drawing method, boundaries of display interfaces of each task may be defined as two rectangular boxes, which are called an inner interface and an outer interface. As shown in FIG. 8, taking a multi-task interface that includes four tasks as an example, zoomed running interfaces of the tasks are drawn on the inner interfaces, and sizes and gaps of the inner interfaces of the tasks are kept the same on the multi-task interface. "Setting an arrangement manner of the task interface" as described in the preceding step 303 is setting the sizes and gaps of the inner interfaces of various tasks, where the sizes and gaps of the inner interfaces of various tasks are determined according to the number of currently running tasks. The zoomed running interfaces of the tasks that are obtained in the preceding step 603 constitute the inner interfaces.

Larger than an inner interface, an outer interface is used to draw additional display elements of a task, such as the music task icon and information about the name of music currently being played as mentioned in a preceding example. As shown in FIG. 7, a scope of the running interface of a music playing task belongs to a scope of an inner interface, and the music name and the task icon belong to a scope of an outer interface. For a task that does not have any additional display element, an outer interface does not need to be drawn or only a blank outer interface may be drawn.

Step 606: Set display positions of the display interfaces obtained in the preceding step.

The display positions are set according to the arrangement manner of the task interface that is set in the preceding step 303.

Step 607: For the non-video playing task for which no additional element needs to be presented, no additional element needs to be acquired and therefore no blit operation needs to be performed. The abbreviated running interfaces of the tasks that are obtained in the step 603 are display interfaces of such tasks. The display positions of such tasks are directly set.

The multi-task interface is obtained after the preceding steps 601 to 607 are executed.

With reference to the content disclosed in the preceding embodiment, in an embodiment of the present invention, drawing of a non-video playing task may be classified into two types: drawing of a non-video playing task with an outer interface and drawing of a non-video playing task without an outer interface.

The drawing of a non-video playing task without an outer interface means that, for a task without any additional display element, only its inner interface is drawn and the inner interface constitutes a display interface of the task. The drawing of a non-video playing task with an outer interface includes two cases: in one case, for a non-video playing task with an additional display element, the additional display element constitutes the outer interface; and in the other case, for a non-video playing task without any additional display element, a blank outer interface is drawn.

The drawing of a non-video playing task without an outer interface includes the following steps:

A. Acquire a running interface of the non-video playing task;

B. Zoom in or out the running interface of the non-video playing task according to a display size of the non-video playing task on the multi-task interface to obtain a display interface of the non-video playing task; and C. Set a display position of the display interface on the multi-task interface according to an arranged position of the non-video playing task on the multi-task interface.

The drawing of a non-video playing task with an outer interface includes the following steps:

A. Acquire a running interface of the non-video playing task;

B. Zoom in or out the running interface of the non-video playing task according to a display size of the non-video playing task on the multi-task interface to obtain an inner interface of the non-video playing task;

C. Draw an outer interface of the non-video playing task; where:

the drawing an outer interface specifically includes the following steps:

C1: Determine whether any additional element needs to be presented for the non-video playing task;

C2. Draw a blank outer interface if no additional element needs to be presented for the non-video playing task;

C3. Acquire additional display elements of the non-video playing task if the additional elements need to be presented for the non-video playing task; and C4. Set a sequential relationship and a transparency relationship between the additional display elements to obtain the outer interface of the non-video playing task.

D. Set a sequential relationship and a transparency relationship between the inner interface and the outer interface of the non-video playing task to obtain a display interface of the non-video playing task; and E. Set a display position of the display interface on the multi-task interface according to an arranged position of the non-video playing task on the multi-task interface.

It should be noted that, in the embodiment of the present invention, sizes and gaps of inner interfaces of various tasks are kept the same; while for the outer interfaces, because some tasks do not have any additional display element, probably they do not have any outer interface or have only one blank outer interface, gaps of outer interfaces of various tasks are not the same, and the outer interfaces of various tasks may overlap or cover one another on a precondition of ensuring that the additional elements of the tasks are not shaded. Then various multi-task interfaces with varied appearance and proper layout may be obtained from combination through the foregoing operations.

Figure 9:
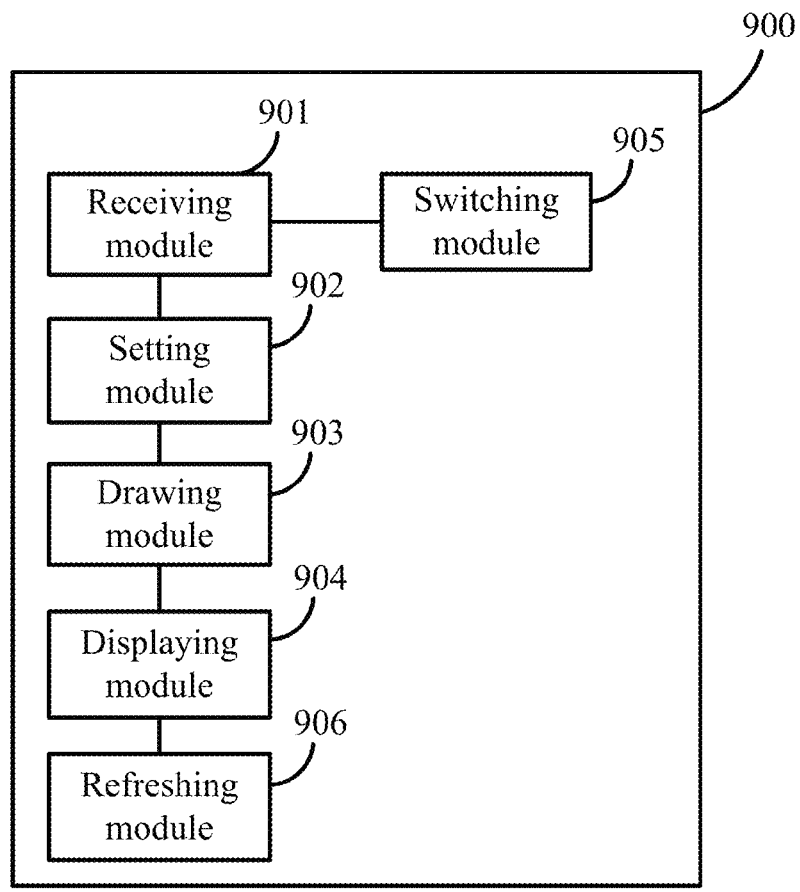
FIG. 9 is a schematic structural diagram of a terminal according to an embodiment of the present invention.

With reference to foregoing embodiments, this embodiment discloses a terminal, configured to implement the solutions for displaying a multi-task interface that are disclosed in the foregoing embodiments of the present invention. FIG. 9 is a schematic structural diagram of a terminal according to an embodiment of the present invention. The terminal includes but is not limited to a mobile phone, a set-top box, a tablet computer, and the like. The following describes in detail various modules of the terminal. The terminal includes:

a receiving module 901, configured to receive a request submitted by a user for displaying a multi-task interface;

a setting module 902, configured to acquire tasks started by the user and set, according to the number of tasks started by the user and a start sequence, an arrangement manner of the multi-task interface; where:

a task to be displayed on the multi-task interface is a task that the user has started and has not yet exited and generally includes a corresponding task interface but excludes a back-end service automatically started by a system, for example, an NTP (Network Time Protocol, Network Time Protocol) time service will not be displayed on the multi-task interface; and the setting, by the setting module 902, an arrangement manner of the multi-task interface specifically includes setting arranged positions and sizes of the tasks started by the user on the multi-task interface;

a drawing module 903, configured to classify the tasks started by the user and acquired by the setting module 902 into a video playing task and a non-video playing task, and separately draw, according to the arrangement manner of the multi-task interface that is set by the setting module 902, the video playing task and the non-video playing task to obtain the multi-task interface; where:

a reason why to classify the tasks started by the user into the video playing task and the non-video playing task and separately draw them has been described in detail in the preceding embodiment and not re-stated herein; and a displaying module 904, configured to display the multi-task interface drawn by the drawing module 903 to the user.

As shown in FIG. 9, a terminal provided in an embodiment of the present invention further includes a switching module 905, configured to switch, after the receiving module 901 receives the request submitted by the user for displaying a multi-task interface, a currently running task on the terminal to a back end and determine whether the task is a music playing task; and continue to run the task if the task is a music playing task, or pause the task if the task is not a music playing task.

After receiving the request submitted by the user for displaying a multi-task interface, the terminal needs to switch the currently running task to the back end and perform a different operation according to a type of the task. Particularly, in this embodiment, if the currently running task is a music playing task, the running of the task continues; or if the currently running task is not a music playing task, the running of the task is paused.

After the displaying module 904 displays the drawn multi-task interface to the user, running interfaces of tasks displayed on the multi-task interface, such as a video phone task and an electronic album task, may further be periodically updated. Therefore, a terminal provided in another embodiment of the present invention further includes an updating module 906, configured to periodically update the multi-task interface after the displaying module 904 displays the multi-task interface to the user.

Figure 10:
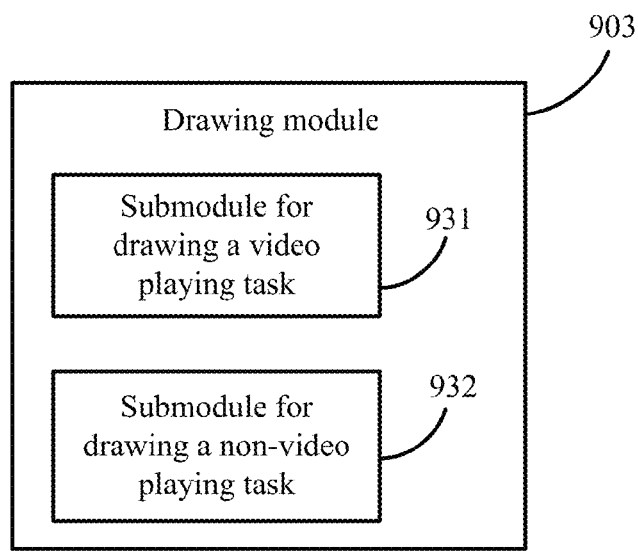
FIG. 10 is a schematic diagram of the internal structure of a drawing module according to an embodiment of the present invention.

The drawing module 903 separately draws the video playing task and the non-video playing task. Corresponding to this, as shown in FIG. 10, in an embodiment of the present invention, the module is divided into a submodule 931 for drawing a video playing task and a submodule 932 for a drawing non-video playing task, respectively configured to draw the video playing task and the non-video playing task.

The submodule 931 for drawing a video playing task is configured to set a display attribute of a decoder according to an arranged position and a display size of the video playing task on the multi-task interface.

The submodule 931 for drawing a video playing task sets the display attribute of the decoder by directly invoking an API, so that the video playing task can be displayed at a corresponding position according to the set size on the multi-task interface.

The drawing, by the submodule 932 for drawing a non-video playing task, a non-video playing task is specifically:

acquiring a running interface of the non-video playing task; zooming in or out the running interface of the non-video playing task according to a display size of the non-video playing task on the multi-task interface to obtain a display interface of the non-video playing task; and setting a display position of the display interface on the multi-task interface according to an arranged position of the non-video playing task on the multi-task interface.

Alternatively, the drawing, by the submodule 932 for drawing a non-video playing task, a non-video playing task is specifically:

acquiring a running interface of the non-video playing task; zooming in or out the running interface of the non-video playing task according to a display size of the non-video playing task on the multi-task interface to obtain an inner interface of the non-video playing task; drawing an outer interface of the non-video playing task; setting a sequential relationship and a transparency relationship between the inner interface and the outer interface of the non-video playing task to obtain a display interface of the non-video playing task; and setting a display position of the display interface on the multi-task interface according to an arranged position of the non-video playing task on the multi-task interface.

By using the terminal disclosed in the embodiment of the present invention, after a request submitted by a user for displaying a multi-task interface is received, a video playing task and a non-video playing task are separately drawn when a multi-task interface to obtain display interfaces of the tasks is drawn instead of simply displaying icons of the tasks. In this way, running interfaces of the tasks are displayed and, compared with the icons of the tasks, are capable of conveying more information to the user. This better helps to distinguish various tasks from one another. In addition, an updating mechanism is added during display of the multi-task interface and is capable of updating a display interface of a task in real time.

An embodiment of the present invention provides a remote control for operating a set-top box. As shown in FIG. 4, the remote control for a set-top box includes a multi-task interface function key. A user sends a request for displaying a multi-task interface to the set-top box by pressing this key.

After receiving a key-pressing operation performed by the user on the multi-task interface function key, the remote control identifies the key-pressing operation as a command for displaying a multi-task interface and sends a request for displaying the multi-task interface to the set-top box. After performing the operations for displaying the multi-task interface that are disclosed in the preceding embodiment, the set-top box displays the multi-task interface through a television set to the user.

The remote control mentioned in this embodiment includes but is not limited to a conventional remote control, a soft remote control (auxiliary control software developed on Android or iOS), an air mouse, and the like. Using the remote control provided in the embodiment of the present invention solves a defect that an existing remote control does not have a multi-task interface function key, and a user may send a request for displaying a multi-task interface by performing an operation of pressing this key, thereby greatly improving user experience.

Persons of ordinary skill in the art may be aware that, in combination with the methods described in the embodiments disclosed in this specification, the steps and units may be implemented by electronic hardware, computer software, or a combination thereof. To clearly describe the interchangeability between the hardware and the software, the foregoing has generally described compositions and steps of every embodiment according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The steps of the methods described by combining the embodiments disclosed in this specification may be implemented by hardware, a software program executed by a processor, or a combination thereof. The software program may be placed in a random access memory (RAM), a memory, a read-only memory (ROM), an electrically programmable ROM, an electrically erasable programmable ROM, a register, a hard disk, a movable disk, a CD-ROM, or a storage medium in any other form publicly known in the technical field. The software or program includes the following steps: (method claims).

Although some embodiments of the present invention have been shown and described, persons of ordinary skill in the art should understand that they may make various modifications to these embodiments without departing from the principle and spirit of the present invention and such modifications should fall within the scope of the present invention.

What is claimed is:

1. A method for displaying a multi-task interface, comprising:
    receiving, by a terminal, a request for displaying a multi-task interface;
    acquiring tasks started and setting, according to the number of tasks started and a start sequence, an arrangement manner of the multi-task interface, wherein the arrangement manner of the multi-task interface comprises arranged positions and display sizes of the tasks started on the multi-task interface;
    classifying the tasks started into a video playing task and a non-video playing task; and
    drawing the video playing task and the non-video playing tasks separately according to the arrangement manner of the multi-task interface to obtain the multi-task interface, and displaying the multi-task interface, wherein the drawing the non-video playing task according to the arrangement manner of the multi-task interface comprises:
        acquiring a running interface of the non-video playing task;
        zooming in or out the running interface of the non-video playing task according to a display size of the non-video playing task on the multi-task interface to obtain the display interface of the non-video playing task; and
        setting a display position of the display interface on the multi-task interface according to an arranged position of the non-video playing task on the multi-task interface.

2. The method according to claim 1, after the displaying the multi-task interface, further comprising:
    updating a display interface of the non-video playing task on the multi-task interface.

3. The method according to claim 2, wherein the updating the display interface of the non-video playing task on the multi-task interface comprises:
    acquiring an updating period of the non-video playing task; and
    periodically re-drawing the non-video playing task according to the updating period to obtain the updated display interface of the non-video playing task on the multi-task interface.

4. The method according to claim 1, wherein the drawing the video playing task according to the arrangement manner of the multi-task interface comprises:
    setting a display attribute of a decoder of the video playing task according to an arranged position and a display size of the video playing task on the multi-task interface.

5. The method according to claim 1, wherein the receiving, by the terminal, the request for displaying a multi-task interface comprises:
    receiving, by a set-top box, the request through a remote control for displaying a multi-task interface.

6. The method according to claim 5, after the displaying the multi-task interface to the user, further comprising:
    monitoring, by the set-top box, a duration in which a focal point of the remote control stays on the multi-task interface, and if the duration reaches a preset value, switching the currently running task to a task on which the focal point of the remote control stays.

7. A method for displaying a multi-task interface, comprising:
- receiving, by a terminal, a request for displaying a multi-task interface;
- acquiring tasks started and setting, according to the number of tasks started and a start sequence, an arrangement manner of the multi-task interface, wherein the arrangement manner of the multi-task interface comprises arranged positions and display sizes of the tasks started on the multi-task interface;
- classifying the tasks started into a video playing task and a non-video playing task; and
- drawing the video playing task and the non-video playing task separately according to the arrangement manner of the multi-task interface to obtain the multi-task interface, and displaying the multi-task interface, wherein the drawing the non-video playing task according to the arrangement manner of the multi-task interface comprises:
  - acquiring a running interface of the non-video playing task;
  - zooming in or out the running interface of the non-video playing task according to a display size of the non-video playing task on the multi-task interface to obtain an inner interface of the non-video playing task;
  - drawing an outer interface of the non-video playing task;
  - setting a sequential relationship and transparency relationship between the inner interface and the outer interface of the non-video playing task to obtain the display interface of the non-video playing task; and
  - setting a display position of the display interface on the multi-task interface according to an arranged position of the non-video playing task on the multi-task interface.

8. The method according to claim 7, wherein the drawing the outer interface of the non-video playing task comprises:
- determining whether any additional element should be presented for the non-video playing task; and
- drawing a blank outer interface if no additional element should be presented for the non-video playing task, or acquiring additional display elements of the non-video playing task if the additional elements should be presented for the non-video playing task; and
- setting a sequential relationship and transparency relationship between the additional display elements to obtain the outer interface of the non-video playing task.

\* \* \* \* \*